US005932328A

United States Patent [19]

Burke et al.

[11] Patent Number: 5,932,328

[45] Date of Patent: Aug. 3, 1999

[54] COATING COMPOSITION FOR HARD SURFACES

[75] Inventors: Peter A. Burke, Downingtown, Pa.; Kenneth J. Flanagan, Lakeland, Tenn.; Abul Mansur, Douglassville, Pa.

[73] Assignee: Sara Lee Corporation, Douglassville, Pa.

[21] Appl. No.: 08/626,633

[22] Filed: Apr. 1, 1996

[51] Int. Cl.[6] .............................. B32B 7/02; B32B 27/06; B32B 27/32; B32B 27/34

[52] U.S. Cl. .......................... 428/212; 428/421; 428/422; 428/447; 428/448; 428/452; 106/3; 106/11; 106/285; 106/287.13

[58] Field of Search .................................... 428/421, 422, 428/447, 448, 540, 541, 452, 212; 106/3, 10, 11, 285, 285.13

[56] References Cited

U.S. PATENT DOCUMENTS

| | | | |
|---|---|---|---|
| 4,163,673 | 8/1979 | Dechert | 106/11 |
| 4,936,914 | 6/1990 | Hurley | 106/3 |
| 5,085,695 | 2/1992 | Randen et al. | 106/8 |
| 5,112,394 | 5/1992 | Miller et al. | 103/3 |
| 5,536,304 | 7/1996 | Coppens et al. | 252/8.57 |
| 5,637,772 | 6/1997 | Malik et al. | 564/505 |

*Primary Examiner*—Vivian Chen
*Attorney, Agent, or Firm*—John Lezdey & Assoc.

[57] ABSTRACT

A furniture surface having a coating consisting of a bottom layer comprising a silicone oil adjacent to the furniture surface and a top layer comprising an oil having a specific gravity less than the silicone oil in the bottom layer and a water repelling film-forming fluorinated polymer. The coating may consist of a bottom layer comprising a silicone oil adjacent to the furniture surface, an intermediate layer comprising a water repelling film-forming fluorinated polymer, and a top layer comprising an oil having a specific gravity less than the silicone oil in the bottom layer. The coating may also consist of a bottom layer comprising a silicone oil adjacent to the furniture surface, an intermediate layer comprising an oil having a specific gravity less than the silicone oil in the bottom layer, and a top layer comprising a water repelling film-forming fluorinated polymer.

15 Claims, 1 Drawing Sheet

COATING COMPOSITION FOR HARD SURFACES

FIELD OF THE INVENTION

The present invention relates to coating compositions for hard surfaces. More particularly, the invention comprises coating compositions containing silicone-based fluids and fluorinated polymers. Most particularly, the invention is directed to furniture polish compositions formulated from these components.

DESCRIPTION OF THE PRIOR ART

Furniture polish compositions which upon the evaporation of the volatile carriers, produce a coating or film having water protection, smear resistance and improved depth-of-gloss values have long been desired. Current commercially available furniture polishes use conventional silicone containing or silicone-based fluids to achieve some of the above desired characteristics. To improve the depth-of-gloss values, dimethyl silicones are substituted in part for conventional film forming materials such as waxes, surfactants and oils. However, dimethyl silicones, many of which are liquids, naturally tend to smear and streak after application. Thus, a critical balance of components must be maintained so that the improvement of one property does not compromise the other desirable characteristics of the film. The combination of conventional silicone-containing or silicone-based fluids with certain conventional waxes, surfactants and/or certain oils initially may provide an aesthetically appealing surface appearance but ultimately suffer from a variety of inherent disadvantages. For example, the addition of oil and/or surfactants to formulations containing dimethyl silicones cause the deposited films to have poor smear resistance.

U.S. Pat. No. 5,112,394 to Miller discloses furniture polish compositions utilizing dimethyl silicones and poly (dimethyl)copoly (methyl, oxygen containing) siloxane copolymers (G.E., silicone copolyol). Furniture polish compositions formulated with this combination of components can provide a lacquered furniture surface with films that possess acceptable depth-of-gloss qualities while maintaining improved smear recovery properties. The above described components form separate layers on the lacquered furniture surface. The patentee discloses (col. 5, line 65 to col. 6, line 7) that "the dimethyl silicone forms the uppermost layer; the poly (dimethyl) copoly (methyl, oxygen-containing) siloxane forms an intermediate layer and the furniture lacquer layer defines the true or "actual" surface of the furniture. Thus, the poly (dimethyl)-copoly (methyl, oxygen containing) siloxane possesses a relatively greater specific gravity than the dimethyl silicone. In particular, the specific gravity of the dimethyl silicone typically ranges between 0.90 and 0.97. The patentee further points out (col. 1, line 68 to col. 2, line 2) that the addition of oil and/or surfactant tends to make a smear more visible which is generally undesirable. However, by teaching away from the use of oil, the compositions based on the Miller components yield only acceptable depth-in-gloss values.

This is believed to result from the fact that the upper dimethylsilicone layer has a refractive index of 1.40 which is lower than the lower poly (dimethyl) copoly (methyl, oxygen containing) siloxane layer and the lacquered surface which has a refractive index of about 1.50.

SUMMARY OF THE INVENTION

The present invention provides a coating composition which yields a film on a hard surface having smear resistance, water protection and improved depth-in-gloss values comprising;

a top surface layer comprising a natural or synthetic oil and a layer comprising a water repelling film forming fluorinated polymer or a mixture thereof; and a bottom layer comprising a silicone polymer in contact with the hard surface.

The coating composition of the present invention comprises mutually-immersible film forming liquids (i.e. liquids at room temperature) which separate according to their respective specific gravities and upon effective evaporation of the volatile carriers yield a film having the above-identified strata. While the coating composition of the present invention is suitable for any hard surface, i.e. wood, metal, plastic or ceramic, the formulations are particularly designed for furniture applications especially furniture having a lacquer layer or film on at least a portion of the external surfaces thereof.

One preferred coating composition according to the present invention particularly useful for lacquered furniture forms a film which comprises:

a top layer comprising a mineral oil and polysiloxane copolyol;

an intermediate layer of said fluorinated polymer; and a bottom layer of a silicone oil in contact with a hard surface.

Another preferred coating composition for forming two or three layers of the invention comprises an aqueous composition containing a water repelling film forming fluoroamide polymer, hydrocarbon oil or solvent and silicone oil. The fluoroamide polymer is advantageously used in combination with a hydrocarbon oil, preferably a paraffinic oil and generally forms the intermediate layer.

The compositions of this invention can be provided in aerosol form.

An object of this invention is to provide a coating composition for hard surfaces which provides water protection, an increased smear resistance of the coating and imparts to the surface an improved depth-of-gloss aesthetic appearance.

It is another object of the present invention to provide a coating composition which contains a compatible water and film forming fluorinated polymer layer and a mineral oil layer.

It is yet another object of the present invention to provide the coating composition as a furniture polish formulation.

A further object of the present invention is to provide the furniture polish in aerosol form.

A still further object of the present invention is to provide an improved depth-of-gloss value to furniture having a lacquered external finish.

The foregoing, as well as other objects, features and advantages of this invention will become more readily apparent to those skilled in the art upon reference to the following detailed description. Accordingly, the present invention differs from and is an improvement over Miller.

DETAILED DESCRIPTION OF THE PREFERRED EMBODIMENTS

Figure 1:
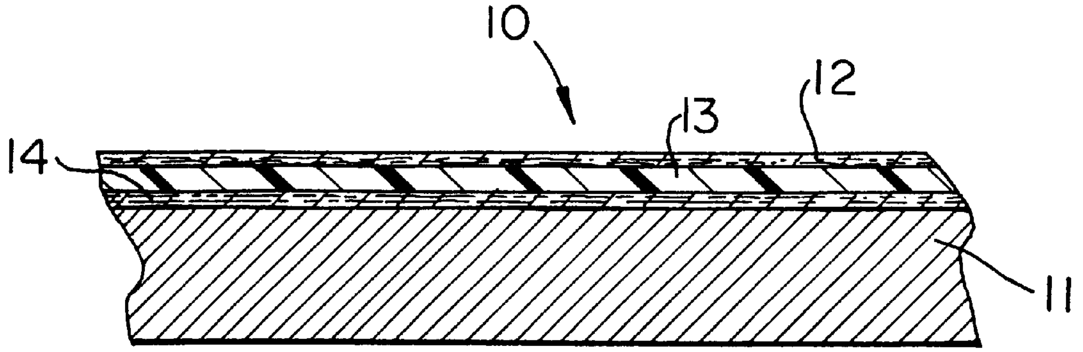
FIG. 1 is a sectional view showing one embodiment of the multi-layer coating composition of the invention which forms a laminate comprising a hard surface having a first layer of a dimethyl silicone, a water compatible film forming fluorinated polymer as the intermediate layer and a polysiloxane copoyol and/or mineral oil as the top layer.

According to the present invention, the coating composition comprising several immiscible liquids which upon effective evaporation of the carrier solvents form a multilayer film of the components commensurate with the respective specific gravity of each component. Generally it is the specific gravity of the component measured at 25° C. As shown in FIG. 1 the top or uppermost layer 12 of a coating 10 on a hard surface 11 comprises a natural or synthetic oil having the lowest specific gravity relative to any of the other components. In particular, the specific gravity of this top oil ranges between 0.85 and 0.95. The intermediate layer 13 comprises a water reducible fluorinated polymer having a specific gravity of between 1.0 and 1.7 preferably between 1.1 and 1.4. The top (see Experiment VIII, Part B hereinafter) layer may also contain polysiloxane polyalkyl polyether copolymer having a specific gravity of between 0.90 and 0.95 and preferably between 0.92 to 0.94. Alternatively, the polysiloxane copolymers may be used without the fluorinated polymer to form the top layer (see Experiment VIII, Part C hereinafter). Conversely, the fluorinated polymer may be used alone to form the top layer. The bottom layer which is in contact with the hard surface is comprised of a silicone polymer such as dimethyl silicone having a specific gravity of between 0.90 to 0.98 and preferably between 0.93 to 0.97.

It should be understood that the fluorinated polymer may be at times solubilized in some cases so as to be found in some amounts in other layers or be insoluble and forming a single separate layer.

In the present invention, the dimethyl silicone is required to have a specific gravity greater than the oil or the copolyol or mixtures of the oil and copolyol and any of the other immiscible components of the resulting film. Generally, a difference of 0.05 in specific gravity will ensure that it will form the bottom layer 14 (exclusive of a lacquer or paint coating) on the hard surface.

Figure 2:
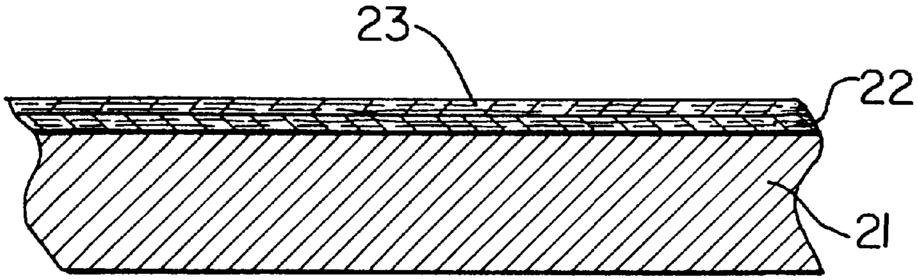
FIG. 2 PRIOR ART
FIG. 2 is a sectional view of a multi-layer coating of the prior art showing a polysiloxane copolymer as a first layer in contact with the hard surface and a dimethyl silicone as the top layer.

In contrast, FIG. 2 shows the polysiloxane copolyol as the first or bottom layer 22 which is in contact with the hard surface substrate 21 with the dimethyl silicone as the top layer 23. This is an important distinction. The relative position in the film of each component has a profound effect on the important performance parameter referred to as "depth-of-gloss".

Depth-of-gloss is a light-reflectance property relates to a characteristic of a polished lacquered surface to reflect light. A high shine is a particular depth-of-gloss quality which occurs when relatively more light is reflected from the surface of the film.

Therefore, to provide the maximum reflectance to enhance "depth-of-gloss" parameter the refractive indices of each adjacent component should be very similar. The other factor is film thickness of the film which should range between 200A° and 2000A°.

According to one embodiment of the invention the mineral oil, silicone polymer, surfactant and fluorinated polymer each have a refractive index of about 1.35 to 1.48. When the components have their refractive indices within this range the final product provides a film coating having excellent depth-of-gloss values.

Dimethyl silicones also referred to as polydimethyl siloxanes encompasses a wide number and range of commercially available materials are generally well known and utilized in prior art furniture polish compositions. The preferred are dimethyl silicones are those having a refractive index of about 1.39 to 1.48. It has been found to be advantageous to utilize at least two polydimethylsiloxane fluids which have different viscosities. Suitable polydimethyl siloxane fluids are available from a number of suppliers including GE Silicones, Waterford, N.Y. 12188, under the trademark SF 96 in viscosities of 50, 100, 350, and 1000 centistokes and VISCASIL FLUIDS in viscosities of 5000; 10,000; 12,500; 30,000; 60,000 and 100,000 cst. The dimethyl silicones form the first layer which is in contact with the hard surface exclusive of the lacquer or paint coating.

The intermediate layer comprises water repelling fluorinated polymers which may be selected from fluoroamide polymers, polytetrafluoreoethylene, fluoroalkyl polymers, fluoroacrylic polymers, fluorosilicone polymers or the like, and such as disclosed in U.S. Pat. Nos. 5,424,438 and 4,929,666 which are herein corporated by reference. A preferred fluorinated polymer has a refractive index of about 1.35 to 1.48.

The most preferred fluorinated polymers are the fluoroamide polymers sold under the trademark DYNAX by the Dynax Corporation and GALDEN 418 sold by AUSIMONT. The preferred fluoramide polymer has a melting point of about 100–150° F. and has a refractive index of about 1.35 to 1.428 at 120° F. and a specific gravity of greater than 1.05.

The fluoroalkyl polymers are available from 3M Company, St. Paul, Minn. under the trademark FC-214-30 from Ausimont. In the top layer, with or without mineral oil, it is preferable that a polysiloxane polyalkyl polyether copolymer also referred to as cetyl dimethicone copolyol (CTFA) having a specific gravity of 0.915–0.945 and a refractive index of 1.437 to 1.443 is used in conjunction with the water reducible fluorinated polymer in the manner described above. This product is marketed under the trademark ABIL EM-90 by T. H. Goldschmidt AG, Essen, Germany. Alternatively, this product may be used alone to form the top or part of the top layer.

It has been found that by using silicone copolyol (Abil EM-90) that has a specific gravity less than that of the dimethylsilicone, the resulting polish has the silicone polyol as the top layer while the dimethylsilicone is on the bottom layer next to the lacquered wood surface. This is important for depth-in-gloss because the silicone polyol has a refractive index of 1.4375 which is closer to the refractive index of the lacquer which is about 1.5000 or higher and is much greater than the refractive index of dimethylsilicone which is only 1.40 that is found in the prior art (Miller patent). This top layer of silicone copolyol gives a better shine and higher gloss appearance more like high gloss lacquer.

In the top or external layer natural or synthetic oils may be used provided they are within the range of specific gravity and refractive index in order to enhance the depth-in-gloss values. Suitable materials include mineral oils, silicone oils, vegetable oils, cotton seed oil, etc.

Optional ingredients for incorporation into any specific layer or every layer of the film coating would be determined by the ultimate use desired. Emulsifiers or surfactants are selected for their ability to decrease the surface tension between the layers and their effect on the overall viscosity, refractive index, and specific gravity of either layer. It should also be noted that the liquid polysiloxane copolymer layer and the liquid dimethyl silicone layer may contain emulsifier or surfactant or may form an interface between the layers. The latter occurs in the present invention with the water repelling fluorinated polymer. It is preferred that added amounts of emulsifier or surfactant to be minimal so as to minimize the possibility of undesirable effects. Furthermore, the polysiloxane copolymer component of the present invention functions as an emulsifier.

The coating compositions of the present invention can either be oil-in-water dispersion or water-in-oil dispersion. The term "dispersion" as used herein broadly encompasses systems wherein the oil phase as an emulsion, as a colloidal suspension, as a solute, or a combination thereof, i.e., partially in solution and partially in emulsion form.

In accordance with the present invention suitable solvents include water and conventional hydrocarbons solvents. A wide variety of commercially available isoparaffinc hydrocarbon solvents are available and preferred because they are odor free. Other suitable hydrocarbon include hexane, heptane and "Stoddard" solvents. The various hydrocarbon furthermore, can be used individually or in mixtures.

Suitable hydrocarbon solvents include isoparaffinic hydrocarbons, including $C_7$ to $C_{16}$ isoparaffinic hydrocarbon sold under the trademark ISOPAR by Exxon Chemicals, Houston, Tex. These isoparaffinic hydrocarbons are branched chained fully saturated hydrocarbons and are characterized by boiling range. These mixtures are available in boiling ranges of from 98° C. to 255° C. and have a refractive index of 1.39 to 1.48. In addition to the isoparaffinic hydrocarbons, low odor petroleum solvent having a boiling range of 195° C. to 250° C., kerosene, pine oil, napthonic and d-limonene are also acceptable. From an odor standpoint, the isoparaffinic hydrocarbons are preferred as these materials are low in odor. However if odor is not a consideration, substantially any of the above solvents can be utilized. For a variety of reasons, it is preferred to utilize certain relatively high boiling point solvents so that the solvent is in contact for some time with the finish and so that the flammability of any product formulated is somewhat reduced. It is preferred to use an isoparaffinic hydrocarbon solvent having a boiling range of from about 98° C. to about 156° C. and most preferably about 116° C.

Another preferred solvent is Sunpar LW 107 manufactured by Sun Refining and Marketing, Philadelphia, Pa. which is a light paraffinic petroleum distillate having a molecular weight of about 250–300.

The compositions of the present invention also include a mixture of nonionic surfactants. These nonionics are present in minuscule amounts and are present only to help stabilize the emulsion water-out portion of this system. The first component of the nonionic surfactant mixture is a sorbitan surfactant, such as sorbitan monolaurate, sorbitan monooleate, sorbitan trioleate and mixtures thereof.

As an additional nonionic surfactant, it is often desirable to incorporate in a small amount, i.e. from 0.1 to 3% by weight of an ethoxylated sorbitan nonionic such as those sold under the tradename Tweens from ICI America, Wilmington, Del. Suitable nonions include ethoxylated sorbitan monolaurate plus 20 moles of ethylene oxide, ethoxylated sorbitan monopalmitate with 20 moles ethylene oxide, ethoxylated sorbitan monosterate with 20 moles ethylene oxide, ethoxylated sorbitan monooleate with 20 moles ethylene oxide and mixtures thereof. The Tween type ethyoxylated sorbitan nonionics, when combined with the nonethoxylated sorbitan nonionics in appropriate amounts, provide excellent emulsion stability, and increased stain removal performance for the oil-out portion of the emulsion and still retain improved inhibition of soil redeposition. Other nonionic surfactants include the ethoxylated nonylphenols such as Surfonic N series available from Jefferson Chemical, the ethoxylated octophenols, including the TRITON X series available from Rohm and Haas, Philadelphia, Pa. the ethoxylated secondary alcohols such as TERGITOL series available from Union Carbide, Danbury, Conn., the ethyoxylated primary alcohol series, such as the Neodols available from Shell Chemical, Houston, Tex., the polymeric ethylene oxides such as the Pluronics available from BASF Wyandotte. Anionic surfactants such as triethanol amine (TEA) which aids in emulsification may be added.

When a hydrocarbon oil or preferably mineral oil is used in the formulation, it has been found to be advantageous to also use the surfactant polysiloxane polyalkylether copolymer (cetyl dimethicone copolyol) which as a refractive index at 20° C. of 1.437–1.443 and a specific gravity of 0.915–0.945 g/cm$^3$ that is sold under the trademark ABIL EM by Goldschmidt AG of Virginia. A similar product is sold under the trademark TEGOPREN 7008.

Still other conventional additives including but not limited to perfumes and preservatives such as formaldehyde or glutaraldehyde may be added to the coating compositions of this invention.

The compositions of the invention may be applied by spraying with a pump type spray dispenser or by charging the polish into an aerosol spray can using conventional techniques. The composition may also be applied by wiping or brushing with a cloth, brush or sponge. The preferred method of application is by aerosol spray. The general practice for applying this composition is to shake the container well before using, and, holding the container in an upright position, and then spraying the composition onto the surface from a distance of approximately 15.24 centimeters (six inches). The surface is immediately wiped with a clean soft absorbent cloth. The surface may be buffed additionally to the desired shine. Alternately, the spray may be directed to a soft absorbent cloth and the treated cloth wiped onto the surface to be cleaned and polished.

If the composition is to be used in an aerosol form, the typical aerosol compositions include from about 70% to 90% of the composition of the present invention and from about 10% to 30% of a propellent. Any of the typical aerosol propellants, such as hydrocarbon, halogenated hydrocarbon, and compressed gases (e.g. $CO_2$, $N_2$, etc.) can be used. Typical hydrocarbon propellants include propane, butane, isobutane and pentane.

The present invention is more particularly described in the following examples, which is intended as illustrative only, since numerous modifications and variations therein will be apparent to one skilled in the art.

Example I

An aerosol composition was prepared with the following ingredients.

| Ingredient | % by weight Finished Product | % Finished Product Plus Propellant |
|---|---|---|
| DYNAX 4310 | 0.080 | 0.073 |
| Isopar E | 16.480 | 14.982 |
| Sunpar LW 107 | 3.500 | 3.182 |
| Silicone 100 cst | 2.000 | 1.818 |
| Silicone 10,000 cst | 1.000 | 0.909 |
| ABIL EM 90 | 0.300 | 0.273 |
| Water | 76.180 | 69.254 |
| TEA | 0.080 | 0.073 |
| Glutaraldehyde | 0.060 | 0.054 |
| Fragrance | 0.320 | 0.291 |
| Propellant | | 9.091 |
| Total % | 100.000 | 100.000 |

Isopar E was placed in a mixing tank and heated with stirring to a temperature of 110° F. The DYNAX 4310 was added and the mixture stirred at a temperature between 110 to 120° F. After all the DYNAX was dissolved, the temperature of the mixture was brought to 90° F. The mixing was continued and there was added the silicone oil, ABIL EM 90 and Sunpar LW 107. When the mixture became homogeneous, the water was added and then glutaraldehyde and TEA. The resulting mixture was then sheared until the mixture had a viscosity of about 1200 cps at 77° F.±2° F.

Results

A coating measuring between 200° A and 2000° A was formed on furniture which formed three distinct layers according to the invention.

In lieu of Dynax 4310 there may be used a fluoropolymer sold under the trademark "GALDEN 410" by Ausimont Corp.

Example II

A cleaning and polishing composition was prepared by mixing the following ingredients according to the procedure of Example I:

| Ingredient | % by weight |
|---|---|
| DYNAX 4310 | 0.30 |
| Nonionic Surfactant | 2.00 |
| Paraffinic Oil (Sunpar LW 107) | 16.00 |
| Silicone Oil Blend | 3.00 |
| Preservative | 0.20 |
| Fragrance | 0.20 |
| Water | QS |
| | 100% |

The composition had a viscosity of 1200 cps.

The composition provided water resistance and had good clarity and an excellent depth-in-gloss characteristic.

Example III

A cleaning and polishing composition was prepared by admixing the following ingredients according to the procedure of Example I:

| Ingredient | % by weight |
|---|---|
| DYNAX 4310 | 0.08 |
| Isopar E | 12.30 |
| Mineral Spirits | 4.30 |
| Dimethyl Polysiloxane 350 CST | 1.28 |
| Dimethyl Polysiloxane 10000 CST | 1.80 |
| ABIL EM 90 | 0.50 |
| Span 80 | 0.08 |
| Tween 80 | 0.09 |
| Carbopol 1622 | 0.04 |
| TEA | 0.02 |
| Glutaraldehyde 25% | 0.06 |
| Sunpar LW 107 | 3.50 |
| Water | QS |
| | 100% |

Results

A coating was formed on a lacquered surface which formed three distinct layers.

Example IV

A cleaning and polishing composition suitable for use in an aerosol was prepared by admixing the following ingredients according to the procedure of Example I:

| Ingredient | % by weight |
|---|---|
| Ceridust 9205-F (PTFE) | 0.20 |
| Tegopren 7007 (Nonionic Surfactant) | 0.50 |
| Sunpar LW 107 | 3.00 |
| Dimethyl Siloxane (100 CPS/ 10,000 CPS (3.1) | 3.00 |
| Preservative | 0.20 |
| Fragrance | 0.20 |
| Exxon 120 (L.O. Mineral Spirits) | 16.00 |
| Water | QS |
| | 100% |

The film of the composition formed two distinct layers.

Example V

A polishing and cleaning composition suitable for use in an aerosol having good depth-of-gloss was prepared by admixing the following ingredients:

| Ingredient | % by weight |
|---|---|
| PTFE SP1003 | 0.08 |
| Isopar E | 16.48 |
| Dimethyl siloxane 100 CPS | 2.00 |
| Dimethyl siloxane 10,000 CPS | 1.00 |
| ABIL EM 90 | 0.30 |
| TEA | 0.08 |
| Glutaraldehyde 25% | 0.06 |
| Fragrance | 0.32 |
| Sunpar LW 107 | 3.50 |
| Water | QS |
| | 100% |

The composition produced a clear film having excellent water repellency and good rub out.

Comparative Example I

A cleaning and polishing composition with a microwax in lieu of a fluorinated polymer was prepared with the following ingredients:

| Ingredient | % by weight |
|---|---|
| Microwax | 0.25 |
| Isopar E | 16.48 |
| Silicone Oil (100 cps) | 1.50 |
| Silicone Oil (10000 cps) | 0.50 |
| TEA | 0.08 |
| Glutaraldehyde 25% | 0.06 |
| Fragrance | 0.32 |
| Water | QS |
| | 100% |

The composition produced a clear film having acceptable emulsion quality and rub out characteristics but poor water repellency.

Comparative Example II

The composition of Comparative Example I was prepared and 0.10% by weight of DYNAX 4310 was added.

The resultant composition had good water repellency and acceptable rub out characteristic but produced a cloudy film.

Conclusion

The coating did not form distinct layers.

Example VI

A piece of commercial paneling containing a typical finish was obtained from a lumber company. DYNAX was incorporated into Sunpar Oil at 0.08% and one coat of this mixture was applied to a portion of the paneling. Adjacent to the coating of oil and DYNAX, one coat of Sunpar Oil without DYNAX was applied.

Three jars of ice were then placed on the paneling. One jar was placed where no oil or Dynax was applied (control 1) and another jar was placed on the area where just the Sunpar Oil was applied (control 2). Between the two controls was placed the third jar of ice where the Dynax and Sunpar Oil solution was applied. Beneath the jars of ice, 2 mls. of water was placed. The jars were then allowed to stand for 3 days and observed for damage to the wood.

Results

1. Control 1 (no oil or DYNAX) showed considerable damage over the whole surface below the jar.

2. Control 2 (oil without DYNAX) showed damage over 70% of the surface.

3. The area where DYNAX and oil was tested, showed less damage than Control 1 and Control 2.

Example VII

A study was performed comparing the separation of oils used in the compositions of the present invention.

Experiment A utilizes a furniture polish of Miller described at column 13, Table III wherein 1.5 parts (25%) of G.E. siloxane copolymer to 4.5 parts (75%) of dimethysilicone.

Experiment B utilizes a furniture polish of the present invention (Example 1) wherein 0.08% DYNAX, 2.0% ABIL EM-90 silicone copolyol and dimethylsilicone which results in a ratio of 0.08 parts (1.32%) DYNAX 98.68% of the polish.

Experiment C utilizes a furniture polish of the present invention (Example 1) wherein 0.08% DYNAX, 0.3% ABIL EM-90, 3.5% mineral oil and dimethylsilicone was utilized. The ratio of Dynax was 1.16% to 98.84% of total polish.

The results are shown in the following:

| Ratio of Separated Layers | Layers | Specific Gravity | Ir | % Separation |
|---|---|---|---|---|
| 4.5 Parts | Dimethylsilicone | 0.9 to 0.97 | 1.40 | 75 |
| 1.5 Parts | G.E. Silicone Copolyol | ~ 1.06 | 1.42 | 25 |
| | Substrate Lacquer | | 1.50 | |

| Ratio of Separated Layers | Layers | Specific Gravity | Ir | % Separation |
|---|---|---|---|---|
| 2.0 Parts | ABIL EM 90 Silicone Copolyol/Oil | 0.915 to 9.30 | 1.4375 | 40 |
| 3.0 Parts | Dimethylsilicone | ~ 0.965 | 1.42 | 25 |
| | Substrate Lacquer | | 1.50 | |

| Ratio of Separated Layers | Layers | Specific Gravity | Ir | % Separation |
|---|---|---|---|---|
| 0.3 ABIL/3.5 Oil | ABIL EM 90 Silicone Copolyol | 0.8631 | 1.4670 | 4.41 ABIL/ 51.47 Oil |
| 3.0 Silicone | Dimethylsilicone | ~0.965 | 1.400 | 44.42 Silicone |
| | Substrate Lacquer | | 1.50 | |

It will be understood that modifications may be made in the invention without departing from the spirit of it. For example, numerous types of oils and volatile solvents may be utilized in place of those specified as being preferred. Accordingly, the scope of the present invention should be considered in terms of the following claims, and it is understood not be limited to that shown and described in the specification.

What is claimed is:

1. In combination with a furniture surface, a coating having smear resistance consisting of a bottom layer comprising a silicone oil adjacent to said furniture surface, and a top layer comprising an oil having a specific gravity less than said silicone oil and a water repelling film forming polymer consisting essentially of a fluorinated polymer.

2. The combination of claim 1 comprising an intermediate layer wherein said intermediate layer comprises said fluorinated polymer and wherein the top layer further comprises polysiloxane polyether copolymer.

3. The combination of claim 1 wherein said top layer oil is a hydrocarbon oil selected from the group consisting of paraffinic oil, isoparaffinic oil and mineral oil.

4. The combination of claim 1 wherein said fluorinated polymer has a specific gravity of about 1.05 to 1.7.

5. The combination of claim 1 wherein said silicone oil has a specific gravity of 0.965 to 0.973.

6. The combination of claim 1 comprising a polysiloxane copolyol having a specific gravity of 0.915 to 0.945 as the top layer and dimethyl silicone having a specific gravity of 0.965 to 0.973 as the bottom layer.

7. The combination of claim 1 wherein said fluorinated polymer is a fluoroamide polymer.

8. The combination of claim 1 wherein said top layer further comprises a polysiloxane polyalkyl polyether copolymer.

9. The combination of claim 1 wherein said top layer comprises a mixture of a polysiloxane polyalkyl polyether copolymer and mineral oil, said mixture having a refractive index of about 1.46.

10. The combination of claim 1 wherein said top layer comprises a vegetable oil.

11. The combination of claim 1 wherein said fluorinated polymer is selected from the group consisting of polytetrafluoroethylene and fluoralkyl polymer.

12. The combination of claim 1 wherein said top layer has a refractive index of at least 1.43.

13. An aqueous composition for forming the film of claim 1 which comprises a water repelling film forming fluoropolymer, hydrocarbon oil, silicone oil and water.

14. The composition of claim 13 in aerosol form.

15. In combination with a furniture surface, a coating consisting of a bottom layer comprising a silicone oil adjacent to a furniture surface, a top layer comprising fluorinated polymer having a specific gravity of about 1.05 to 1.7, and an intermediate layer comprising an oil having a specific gravity less than said silicone oil.

* * * * *